United States Patent
Powell et al.

(10) Patent No.: US 9,778,432 B1
(45) Date of Patent: Oct. 3, 2017

(54) FIBER OPTIC CASSETTE WITH MOUNTING WALL COMPATIBLE LATCH

(71) Applicant: All Systems Broadband, Inc., Livermore, CA (US)

(72) Inventors: James A. Powell, Garner, NC (US); Iuliu Cosmin Gordea, Holly Springs, NC (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

(21) Appl. No.: 15/267,900

(22) Filed: Sep. 16, 2016

(51) Int. Cl.
  *G02B 6/00* (2006.01)
  *G02B 6/44* (2006.01)
  *G02B 6/38* (2006.01)

(52) U.S. Cl.
  CPC ......... *G02B 6/4453* (2013.01); *G02B 6/3897* (2013.01); *G02B 6/4452* (2013.01)

(58) Field of Classification Search
  CPC .................................................. G02B 6/4455
  See application file for complete search history.

(56) References Cited

U.S. PATENT DOCUMENTS

| | | | |
|---|---|---|---|
| 5,497,444 A | 3/1996 | Wheeler | |
| 6,591,051 B2* | 7/2003 | Solheid | G02B 6/4452 385/134 |
| 7,416,349 B2 | 8/2008 | Kramer | |
| 7,536,075 B2 | 5/2009 | Zimmel | |
| 7,706,656 B2 | 4/2010 | Zimmel | |
| 8,139,913 B2 | 3/2012 | Bolster et al. | |
| 8,417,074 B2 | 4/2013 | Nhep et al. | |
| 8,958,679 B2 | 2/2015 | Kramer et al. | |
| 9,301,030 B2 | 3/2016 | Kowalczyk et al. | |
| 9,494,761 B2* | 11/2016 | Ray | G02B 6/4446 |
| 2014/0369653 A1* | 12/2014 | Leigh | G02B 6/4452 385/92 |
| 2015/0316737 A1* | 11/2015 | McPhil Giraud | G02B 6/4453 385/135 |

FOREIGN PATENT DOCUMENTS

DE        3835688 A1    11/1989

\* cited by examiner

*Primary Examiner* — Rhonda Peace
(74) *Attorney, Agent, or Firm* — Murphy, Bilak & Homiller, PLLC

(57) ABSTRACT

A fiber optic cassette includes an enclosure having first and second generally planar outer walls, top and bottom walls, a rear wall, a plurality of standardized fiber optic connectors, and a movable latch that is anchored to enclosure. The movable latch includes a roof section that extends over the top wall and a pair of angled teeth that extend downwards from the roof section towards the bottom wall of the enclosure. The movable latch is configured to move between a first position and a second position. In the first position, the roof section and the angled teeth are vertically spaced apart from the top wall. In the second position, the roof section is flush against the top wall, the first and second teeth overhang over the first and second outer walls, and the pair of angled teeth are disposed at an oblique angle relative to the bottom wall.

19 Claims, 15 Drawing Sheets

FIBER OPTIC CASSETTE WITH MOUNTING WALL COMPATIBLE LATCH

TECHNICAL FIELD

The present invention generally relates to telecommunications systems that utilize fiber optic cable.

BACKGROUND

Today's communication networks provide transport of voice, video, and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth over distance with lower losses and maintenance.

Designers and installers of fiber optic networks are often confronted with significant space constraints that restrict the design of the network. In particular, terminations of fiber optic cabling (e.g., between the service provider and customer) require a dedicated space to accommodate and protect the fiber optic terminations. In some instances, the space available for a termination point may be limited to relatively small cabinets, data centers, and storage area networks. These small spaces are sometimes ill-suited to accommodate the high number of fiber optic terminations associated with modern, high-bandwidth networks. Consequently, network designers are constantly seeking ways to optimize space-efficiency.

High density fiber optic cassette systems have evolved as one solution to provide space-efficient fiber optic terminations. Fiber optic cassettes are standardized modules having a number of ports that are complementary to a standardized endpoint structure of fiber optic cables. These ports provide a plug-and-socket functionality that allows an installer to easily effectuate multiple terminations in an efficient, organized manner. Fiber optic cassettes may be mounted in a high-density optical distribution frame. These optical distribution frames have a number of internal mounting walls, each of the walls having tracks, so that one of the fiber optic cassettes can be secured to two of the mounting walls.

U.S. Pat. No. 6,591,051 to Solheid (hereinafter "Solheid"), which is incorporated by reference herein in its entirety, and U.S. Pat. No. 7,416,349 to Kramer (hereinafter "Kramer"), which is incorporated by reference herein in its entirety, describe examples of a high-density fiber optic distribution systems. Solheid describes a fiber distribution frame that is configured for the mounting of a number of modular fiber termination blocks thereto. The fiber termination blocks are enclosures that accommodate a number of fiber optic terminations. Each fiber optic termination block includes a number of regularly spaced apart mounting walls that are configured for the mounting of a number of fiber optic modules thereto. See, e.g., Solheid, FIG. 5 (depicting a fiber termination block 101 with a number of walls (unlabeled) and sliding adaptor modules 116 mounted to the walls); FIGS. 22-24 (depicting various perspectives of a wall 400 that is provided in the fiber optic termination block). Solheid describes an adaptor module that is configured to slidably mate with the walls of the fiber optic termination block. This is made possible by a track and rail system in which rails of the adaptor module engage with and slide into corresponding tracks that are provided on the mounting walls. The tracks are oriented at an oblique angle relative to the bottom of the fiber optic termination block such that the adaptor modules slide along a tilted angle. See, e.g., Solheid, FIGS. 29, 31 (depicting an adaptor module 316 being slid into the rails of a wall (unlabeled) along an angle G that is oblique relative to the bottom of the fiber optic termination block).

U.S. Pat. No. 8,417,074 to Nhep (hereinafter "Nhep"), which is incorporated by reference herein in its entirety, describes an example of a rear enclosure that is compatible with the adaptor module described by Solheid and Kramer. See, e.g., Nhep, FIGS. 4-9 (depicting rear module 36 that attaches to an adaptor block 56). The enclosure attaches to the adaptor module and provides an area for optical circuitry, e.g., splitters, multiplexers, attenuators, etc., to be stored and secured. This optical circuitry can be connected to some or all of the standardized fiber optic connectors that are disposed on the adaptor module.

SUMMARY

A fiber optic cassette that is dimensioned to be inserted between two spaced apart walls of an optical distribution box is disclosed. According to an embodiment, the fiber optic cassette includes an enclosure having first and second generally planar outer walls that are spaced apart from and parallel to one another, top and bottom walls that are spaced apart from and parallel to one another, and a rear wall. The fiber optic cassette further includes a plurality of standardized fiber optic connectors disposed along a front side of the enclosure, the front side being opposite the rear wall. The fiber optic cassette further includes a movable latch that is anchored to the enclosure. The movable latch includes a roof section and a pair of angled teeth. The roof section extends over the top wall of the enclosure. The angled teeth are disposed at outer sides of the roof section and extend downwards from the roof section towards the bottom wall of the enclosure. The movable latch is configured to move between a first position and a second position. In the first position, the roof section and the angled teeth are vertically spaced apart from the top wall. In the second position, the roof section is flush against the top wall, the first and second teeth overhang over the first and second outer walls, and the pair of angled teeth are disposed at an oblique angle relative to the bottom wall.

According to another embodiment, the fiber optic cassette includes an enclosure having first and second generally planar outer walls that are spaced apart from and parallel to one another, top and bottom walls that are spaced apart from and parallel to one another, and a rear wall. The fiber optic cassette further includes a plurality of standardized fiber optic connectors disposed along a front side of the enclosure, the front side being opposite the rear wall. The fiber optic cassette further includes a movable latch that is anchored to the enclosure. The movable latch includes a roof section and a pair of angled teeth. The fiber optic cassette further includes first and second angled shelves extending away from the first and second outer walls. The fiber optic cassette further includes a spring loaded plank having one end extending away from the bottom wall.

A system for effectuating and organizing a plurality of fiber optic connections is disclosed. According to an embodiment, the system includes an optical distribution box having a plurality of mounting walls, each of the mounting walls being spaced apart from one another at regular intervals. Each of the walls includes a pair of tracks extending from a top side of the mounting walls to a floor of the optical distribution box. The tracks are arranged at an oblique angle relative to the floor. The system further includes a fiber optic cassette. The fiber optic cassette includes an enclosure having first and second generally planar outer walls that are spaced apart from and parallel to one another, top and bottom walls that are spaced apart from and parallel to one another, and a rear wall. The fiber optic cassette further includes a plurality of standardized fiber optic connectors disposed along a front side of the enclosure, the front side being opposite the rear wall. The fiber optic cassette further includes a movable latch that is anchored to the enclosure. The movable latch includes a roof section and a pair of angled teeth. The fiber optic cassette further includes first and second angled shelves extending away from the first and second outer walls. The first and second generally planar outer walls are spaced apart from one another by approximately the same distance as a distance between a pair of the mounting walls. The movable latch and the first and second angled shelves are configured to secure the fiber optic cassette to a first pair of the tracks with the first and second angled teeth being engaged with top sections of the first pair of tracks and the first and second angled shelves being flush against corresponding first and second surfaces disposed on a front side of the mounting walls.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 1A, 1B, and 1C, depicts a side-view perspective of a fiber optic cassette with a mounting wall compatible latch, according to an embodiment. FIG. 1A depicts the latch in a second position. FIG. 1B depicts the latch in a first parallel position. FIG. 1C depicts the latch in a first tilted position.

DETAILED DESCRIPTION

Figure 1:
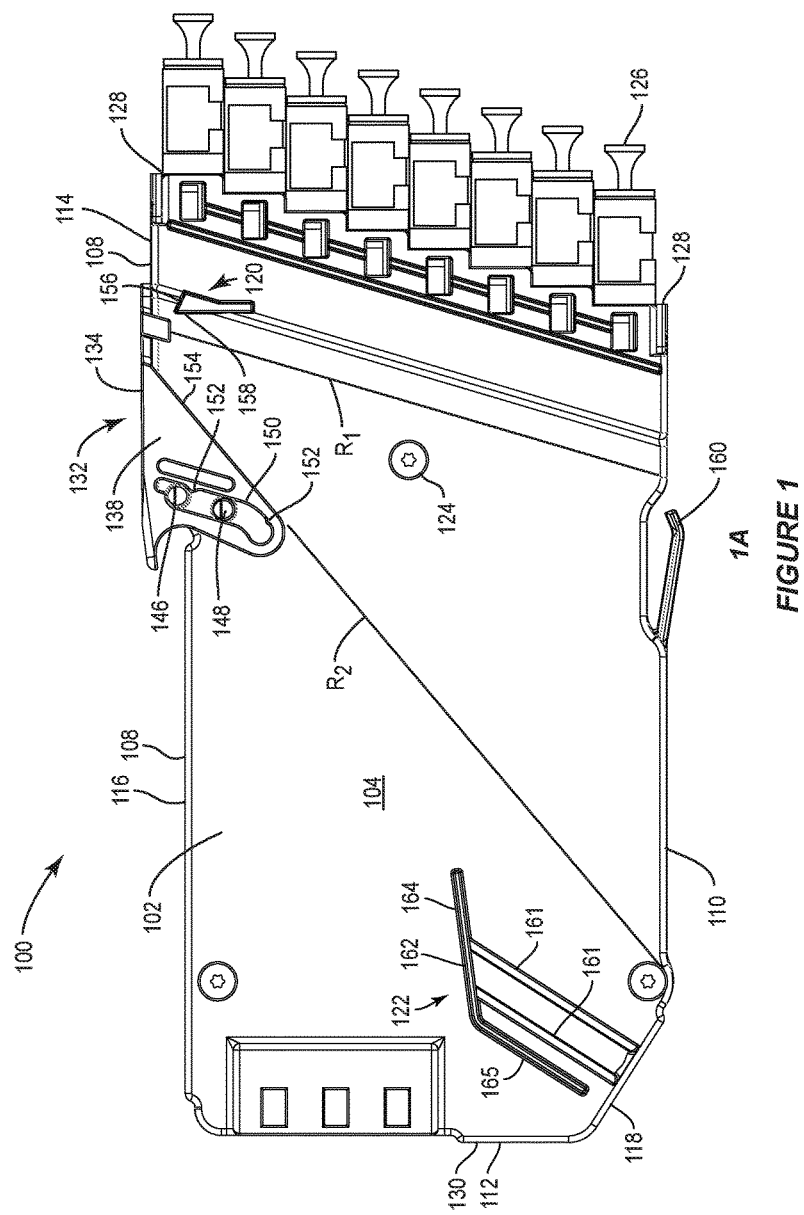
FIG. 1, which includes
Figure 1:
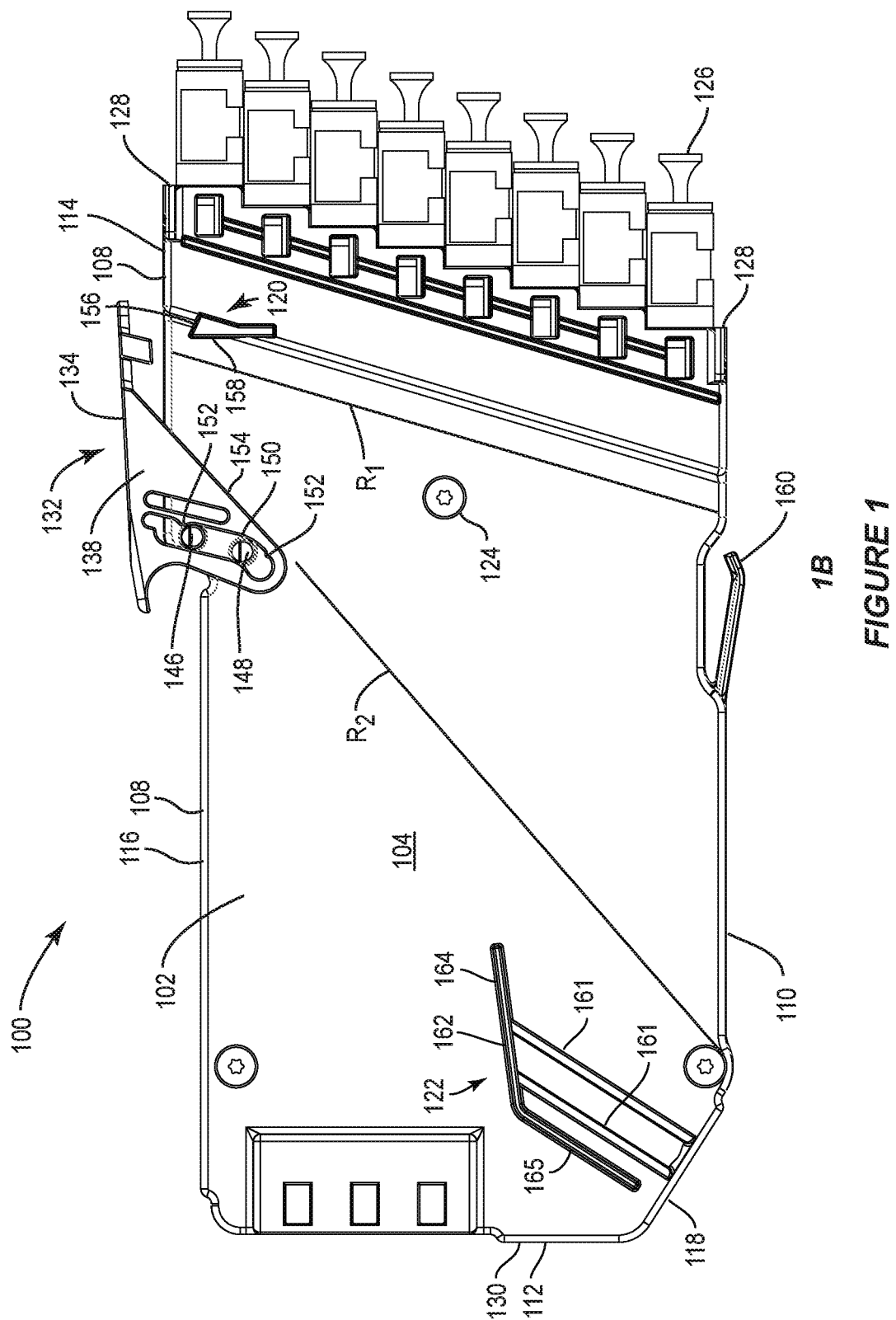
Figure 1:
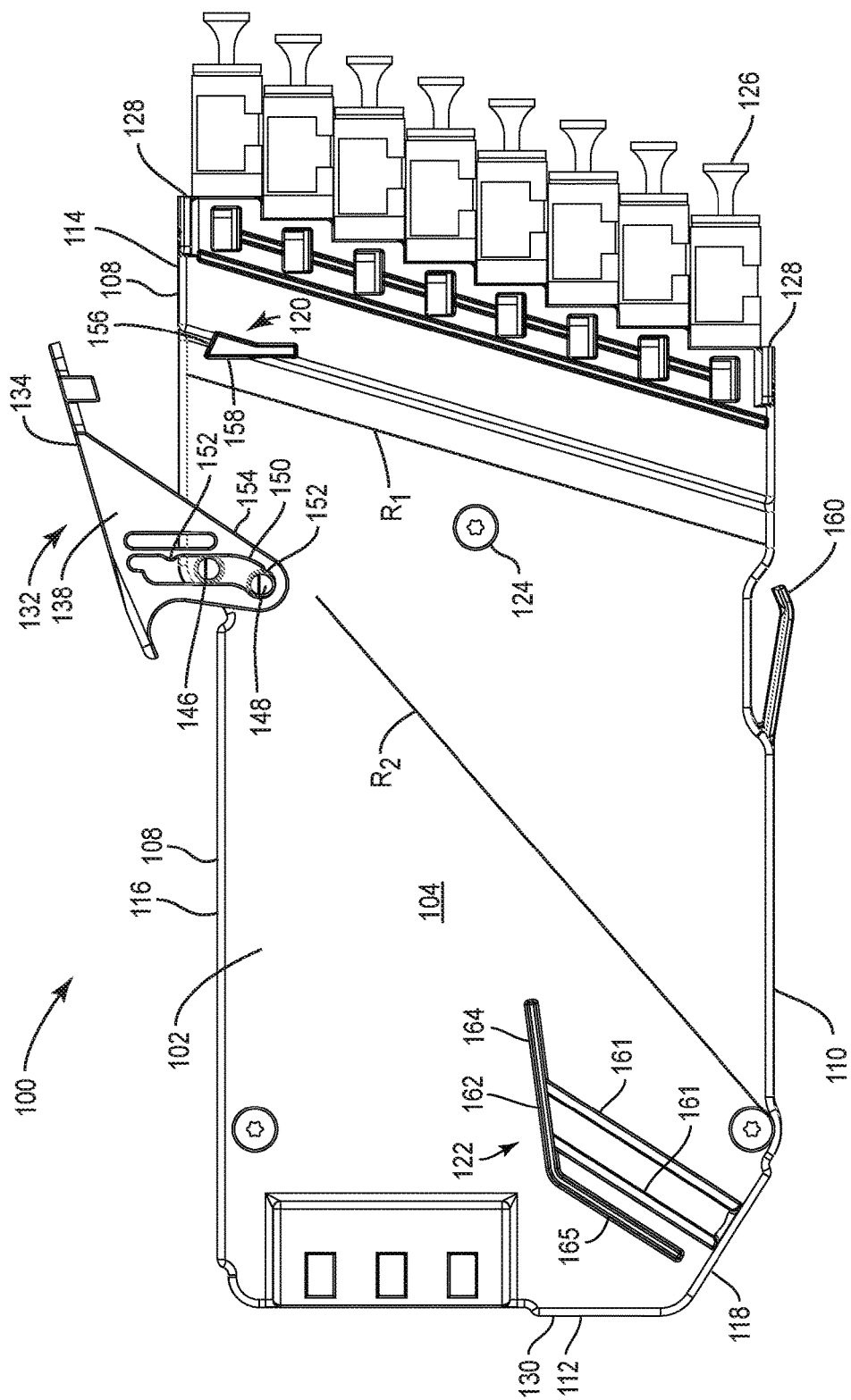

Embodiments described herein include a fiber optic cassette that is compatible with an optical distribution box, such as the NG3® Optical Distribution Frame, which is manufactured by CommScope®. The fiber optic cassette has a rear enclosure that includes generally planar walls and plurality of standardized fiber optic connectors (e.g., SC or LC connectors) disposed along a front side of the enclosure. The rear enclosure encloses an interior volume and is in open communication with rear mating ends of the standardized fiber optic connectors. One or more optical circuits, e.g., splitters, multiplexers, attenuators, etc., can be stored in the rear enclosure. These optical circuits can be connected to some or all of the rear mating ends of the standardized fiber optic connectors.

The fiber optic cassette differs from fiber optic modules described by Solheid, Kramer, and Nhep, which are also compatible with the NG3® Optical Distribution Frame, in that the track and rail system is not used to secure the fiber optic cassette to the mounting walls. That is, the fiber optic cassette does not include a pair of rails that are slidably inserted into the diagonally oriented tracks on the mounting walls. Instead, the fiber optic cassette is simply placed between a pair of the mounting walls, with planar sidewalls of the fiber optic cassette being close to or making low-friction contact with the mounting walls. The fiber optic cassette can be inserted between these two mounting walls along any line of travel because the planar sidewalls of the fiber optic cassette do not engage with the diagonal tracks of the mounting wall as the fiber optic cassette is slid downward.

The fiber optic cassette is fastened to the mounting walls using a movable latch that is disposed on a top side of the cassette. The movable latch includes a roof section, and a pair of angled teeth extending downward from outer sides of the roof. The movable latch can be moved into a first position in which the roof section and the angled teeth are vertically spaced apart from the top wall of the cassette. In the first position, the installer can move the cassette into mounting position with the movable latch clearing the mounting walls. Subsequently, the installer can move the movable latch into a second position in which the roof section is flush against the top wall and the first and second angled teeth overhang over the outer walls of the cassette. If the cassette is properly aligned with the mounting walls, the first and second angled teeth engage with top portions of the tracks in the second position. Thus, the movable latch secures the fiber optic cassette to the mounting walls using the angled teeth.

The fiber optic cassette includes a number of features that are conducive to user friendly installation. For example, the fiber optic cassette may include angled shelves extending away from the outer walls, and a spring loaded plank having one end extending away from the bottom wall. These features work in conjunction with one another to assist the installer in placing the cassette in the correct position for securing the cassette using the movable latch. The installer can bring the fiber optic cassette into the correct position by pressing down on the top wall of the cassette and moving the angled shelves underneath correspondingly oriented planar surfaces that are disposed on a front side of the walls. The spring force generated by the spring loaded plank produces a snap-in effect indicating to the installer that the fiber optic cassette is properly located, and can be secured to the mounting walls using the movable latch.

According to an advantageous embodiment, the fiber optic cassette further includes a diagonal wall section located at a lower rear corner of the enclosure, and a positioning feature adjoining the diagonal wall. These features allow the cassette to be tilted upward when positioned between the walls and unlatched so that the installer can more easily access the standardized fiber optic connectors.

Figure 2:
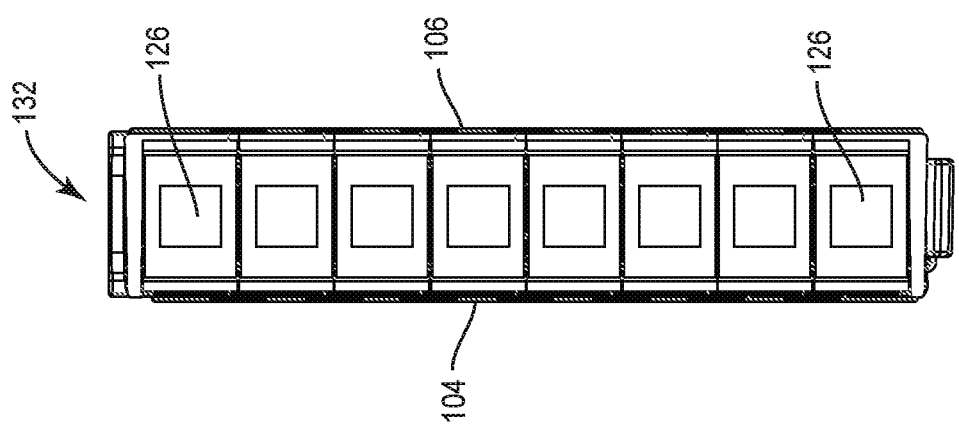
FIG. 2 depicts a front-view perspective of the fiber optic cassette, according to an embodiment.
Figure 3:
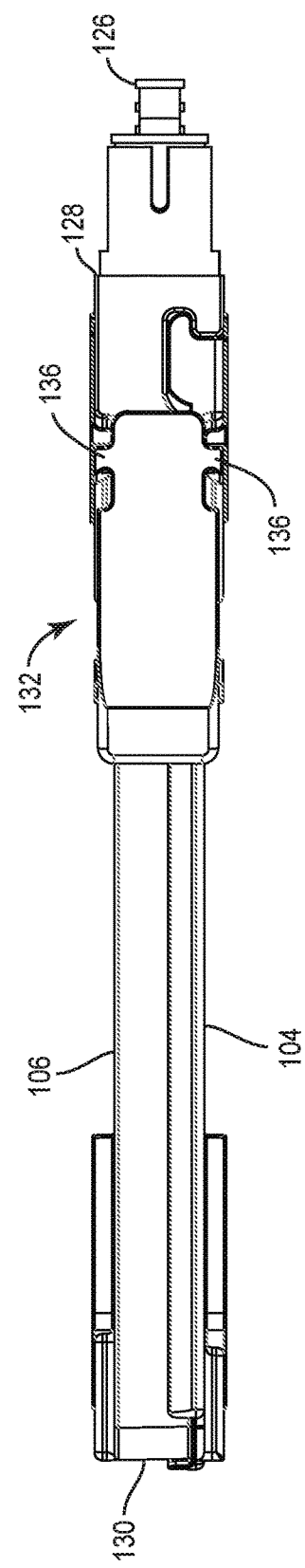
FIG. 3 depicts a plan-view perspective of the fiber optic cassette, according to an embodiment.

Referring to FIGS. 1-3, a fiber optic cassette 100 is depicted from various angles. The fiber optic cassette 100 includes a rear enclosure 102. The rear enclosure 102 may be used to store optical circuitry, e.g., splitters, multiplexers, attenuators, etc. The rear enclosure 102 includes a number of walls that enclose an interior volume, i.e., a three-dimensional space. Specifically, the rear enclosure 102 includes first and second outer walls 104, 106 top and bottom walls 108, 110, and a rear wall 112. The first and second outer walls 104, 106 are spaced apart from one another and can be substantially parallel to one another. The top and bottom walls 108, 110 are also spaced apart from one another and can be substantially parallel to one another. As can be seen, the top wall 108 can include a front section 114 that is vertically offset from a rear section 116. The rear wall 112 extends between the first and second outer walls 104, 106 in a width direction of the fiber optic cassette 100 and extends between the top and bottom walls 108, 110 in a vertical height direction of the fiber optic cassette 100. The rear wall 112 can be perpendicular to the top and bottom walls 108, 110 as well as the first and second outer walls 104, 106. Optionally, the enclosure can include a lower rear wall 118 section that extends between the first and second outer walls 104, 106, and forms an oblique angle with the bottom and rear walls 110, 112. The lower rear wall 118 section can form an angle of roughly between one hundred thirty and one hundred forty degrees with the bottom wall 110, for example, and can form an angle of roughly between forty and fifty degrees with the rear wall 112, for example.

The first and second outer walls 104, 106 of the enclosure can be generally planar. Generally planar means that a substantial majority (e.g., 90% or more) of the surfaces of these walls extends along a single plane. The generally planar walls may include features that protrude away from the planar surfaces. For example, the first and second outer walls 104, 106 may include, among other things, angled shelves 120, and a positioning feature 122, each of which will be described in further detail below. With the exception of these features, the walls can extend along a single plane insofar as manufacturing tolerances will allow for.

The rear enclosure 102 can be made from any of a variety of solid formable materials capable of forming the features described herein. For example, according to an embodiment, the rear enclosure 102 is made from plastic. One of the first and second outer walls 104, 106 of the rear enclosure 102 can be secured to the remaining structure using one or more fasteners 124. These fasteners 124 can be removed by an installer to access the interior volume of the rear enclosure 102.

The fiber optic cassette 100 further includes a plurality of fiber optic connectors 126 disposed along a front side of the rear enclosure 102 that is opposite the rear wall 112. Optionally, the fiber optic connectors 126 can be provided on the rear wall 112 as well. The fiber optic connectors 126 can be any standardized connector that is used to effectuate fiber optical connections between to fiber optic cables. Examples of these connectors include LC and SC connectors. The fiber optic connectors 126 include front-facing ends that protrude away from the cassette and rear-facing ends (not shown) that protrude into the interior volume of the rear enclosure 102. In this way, the fiber optic connectors 126 allow for a fiber optic connection between external fiber optic cables and optical circuitry that is stored within the rear enclosure 102.

According to an embodiment, the front side 128 of the fiber optic cassette 100 is tilted such that the standardized fiber optic connectors 126 are arranged in a staggered vertical array that moves closer to the rear side 130 of the fiber optic cassette 100 with increasing distance from the top wall 108. That is, the front side 128 is non-perpendicular to the top and bottom walls 108, 110. For example, the front side 128 can be oriented at an angle of approximately one hundred five to one hundred ten degrees with respect to the bottom wall 110.

The fiber optic cassette 100 further includes a movable latch 132 that is anchored to enclosure. The movable latch 132 includes a roof section 134, a pair of angled teeth 136, and a pair of angled sidewalls 138. The roof section 134 extends over the top wall 108 of the rear enclosure 102. That is, the roof section 134 covers at least a portion of the top wall 108 when viewed from above. The angled teeth 136 are disposed at outer sides of the roof section 134. The angled teeth 136 vertically extend downwards from the roof section 134 towards the bottom wall 110 of the rear enclosure 102. The sidewalls 138 are disposed at the outer sides of the roof section 134 behind the angled teeth 136 and also vertically extend downwards from the roof section 134 towards the bottom wall 110 of the rear enclosure 102. The movable latch 132 is dimensioned so that the angled teeth 136 and the sidewalls 138 can fit around the first and second outer walls 104, 106. To this end, the roof section 134 is slightly wider than the distance between the first and second outer walls 104, 106 so that the angled teeth 136 and the sidewalls 138 can clear the width of the rear enclosure 102. If, for instance, the top wall 108 is perpendicular to the first and second outer walls 104, 106, the roof section 134 is correspondingly perpendicular to the sidewalls 138 and the teeth 136 so as to conform the shape of the moveable latch 132 to the shape of the top side of the rear enclosure 102.

The movable latch 132 is configured to move between a first position and a second position. FIG. 1A depicts the movable latch 132 situated in the second position. FIGS. 1B and 1C depict the movable latch 132 situated in the first position.

In the first position, the roof section 134 and the angled teeth 136 are vertically spaced apart from the top wall 108. That is, in the first position, there is vertical clearance between the rear enclosure 102 and the bottom of the angled teeth 136.

According to an embodiment, the movable latch 132 can be oriented at two different angles in the first position. In particular, the movable latch 132 can be oriented at a tilted first position, as depicted in FIG. 1C, or a parallel first position, as depicted in FIG. 1B. In the tilted first position, the roof section 134 is tilted on an upward plane such that roof section 134 moves further away from the top wall 108 as it moves towards the front side 128 of the fiber optic cassette 100. In the parallel first position, the roof section 134 is substantially parallel to the top wall 108.

In the second position, the roof section 134 is flush against the top wall 108. That is, the roof section 134 is level with the top wall 108 and in contact with the top wall 108. Moreover, in the second position, the angled teeth 136 overhang past the first and second outer walls 104, 106. That is, the angled teeth 136 partially cover the first and second outer walls 104, 106 when the fiber optic cassette 100 is viewed from the side. In this position, a small amount of clearance exists between the angled teeth 136 and the first and second outer walls 104, 106.

According to an embodiment, in the second position, the angled teeth 136 of the movable latch 132 extend along a first retrograde plane $R_1$. The first retrograde plane $R_1$ is disposed at an oblique angle relative to the top and bottom walls 108, 110 of the rear enclosure 102. More particularly, the first retrograde plane $R_1$ extends between the top wall 108 and the bottom wall 110 and moves closer to the rear side 130 of the rear enclosure 102 with increasing distance from the top wall 108. Thus, when the fiber optic cassette 100 is viewed from the side, the angled teeth 136 extend backwards towards the rear side 130 of the rear enclosure 102 as they extend downward towards the bottom wall 110 of the rear enclosure 102. The first retrograde plane $R_1$ can be disposed at an angle of between one hundred five and one hundred ten degrees relative to the bottom wall 110, and more particularly at an angle of approximately one hundred seven degrees relative to the bottom wall 110. These angles are measured between the first retrograde plane $R_1$ and a portion of the bottom wall 110 that extends from the first retrograde plane $R_1$ towards the rear of the rear enclosure 102.

Figure 11:
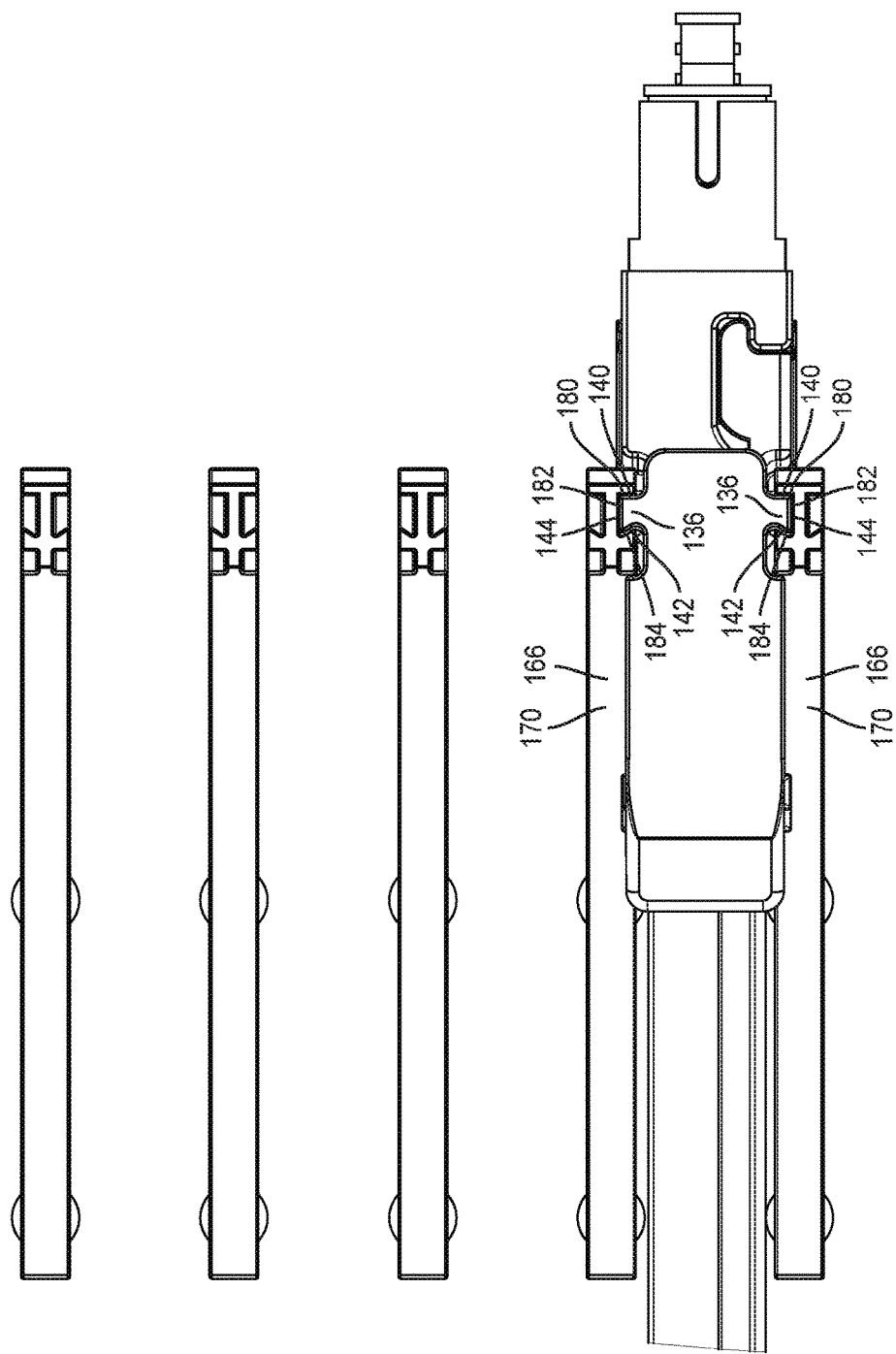
FIG. 11 depicts the fiber optic cassette with the movable latch being secured to the mounting walls from a plan-view perspective, according to an embodiment.

According to an embodiment, the angled teeth 136 include four generally planar faces, namely, a front face 140, a rear face 142, and two outer and inner faces 144. These four generally planar faces are shown in further detail in FIGS. 7 and 11. The front face 140 and the rear face 142 can both extend along the first retrograde plane $R_1$. The outer and inner faces 144 are perpendicular to the front face 140 and parallel to one another. The rear face 142 is disposed at an oblique angle relative to the outer and inner faces 144. More particularly, the rear face 142 can form an acute angle with the outer face 144. Thus, when the fiber optic cassette 100 is seen from above and the movable latch 132 is in the second position (as depicted in FIG. 11), the angled teeth 136 taper inwards so as to narrow as they approach the first and second outer walls 104, 106.

The movable latch 132 is anchored to the rear enclosure 102 by first and second vertically spaced apart posts 146, 148. These vertically spaced apart posts 146, 148 protrude away from the first and second outer walls 104, 106. The sidewalls 138 of the movable latch 132 include vertical slots 150 that receive the first and second vertically spaced apart posts 146, 148. The vertical slots 150 have approximately the same diameter as the first and second vertically spaced apart posts 146, 148 so that the first and second vertically spaced apart posts 146, 148 engage with the vertical slots 150. That is, the vertical slots 150 contact the first and second vertically spaced apart posts 146, 148 on either side. However, there is loose contact between the two so that the movable latch 132 is permitted to slide up and down. This sliding motion permits the movable latch 132 to move from the first position to the second position, and vice-versa.

According to an embodiment, the vertical slots 150 comprise detents 152 that can be used to lock the movable latch into place. Both of the detents 152 are dimensioned to partially surround and retain the posts 146, 148. In the tilted first position, as depicted in FIG. 1C, the second (lower) posts 146 are securely snapped into the lower detent 152. In the parallel first position, as depicted in FIG. 1B, neither one of the first and second posts 146, 148 are snapped into the detents 152. In the parallel first position, the movable latch 132 is permitted to slide up and down. Moreover, the vertical slots 150 are oriented such that, in the parallel first position, the movable latch 132 moves along the first retrograde plane $R_1$. That is, the portion of the vertical slots 150 between the detents 152 is parallel to the first retrograde plane $R_1$. In the second position, as depicted in FIG. 1A, the second (upper) posts 146 are securely snapped into the upper detent 152. A moderate amount of force applied by the user will release the posts from the detents 152.

According to an embodiment, in the second position, front-facing edge sides 154 of the sidewalls 138 of the moveable latch 132 are disposed at an inclined angle relative to the top and bottom walls 108, 110 of the rear enclosure 102. More particularly, the front-facing edge sides 154 extend along a second retrograde plane $R_2$ that extends between the top wall 108 and the bottom wall 110 and moves closer to the rear side 130 of the rear enclosure 102 with increasing distance from the top wall 108. The second retrograde plane R2 can be disposed at an angle of approximately one hundred thirty degrees with the bottom wall 110. This angle is measured between the second retrograde plane R2 and a portion of the bottom wall 110 that extends from the second retrograde plane R2 towards the rear side 130 of the rear enclosure 102.

According to an embodiment, the rear enclosure 102 further includes angled shelves 120 extending away from the first and second outer walls 104, 106. A first one of the angled shelves 120 is disposed on the first wall 104, and a second, identically configured one of the angled shelves 120 (not shown) is disposed on the second outer wall 106. The angled shelves 120 include a first and second planar faces 156, 158 that extend away from the respective outer walls. According to an embodiment, these first and second planar faces 156, 158 are substantially perpendicular to the first and second outer walls 104, 106. The first and second planar faces 156, 158 each extend along planes that are disposed at an oblique angle relative to the top and bottom walls 108, 110. More particularly, the first and second planar faces 156, 158 each extend along planes that extend between the top wall 108 and the bottom wall 110 and move closer to the front side 128 of the fiber optic cassette 100 with increasing distance from the top wall 108. However, the first and second planar faces 156, 158 extend along different planes from one another. The first and second planar faces 156, 158 thus form an acute angle with one another.

According to an embodiment, the rear enclosure 102 further includes a spring loaded plank 160 disposed on the bottom wall 110. In a relaxed state (as shown in FIG. 1), the spring loaded plank 160 extends away from the bottom wall 110 at an inclined angle. When upward force is applied to the spring loaded plank 160, e.g., from a flat surface beneath the cassette upon the application of downward force to the cassette, the spring loaded plank 160 retreats into a position that is nearly parallel with the bottom wall 110. In this state, the spring loaded plank 160 is compressed and applies upward vertical force to the fiber optic cassette 100.

According to an embodiment, the cassette further includes a positioning feature 122 disposed at a lower rear corner of the rear enclosure 102. The positioning feature 122 can include a pair of rails 161 and an angled planar surface 162. The rails 161 may be semi-circular or planar features that protrude away from the first and second outer walls 104, 106. The rails intersect with and are perpendicular to the lower rear wall 118. The angled planar surface may include a first section 165 that is parallel to the rails, and a second section 164 that intersects with the rails. The angled planar surface 162 can be a planar surface that is perpendicular to the first and second outer walls 104, 106.

Figure 4:
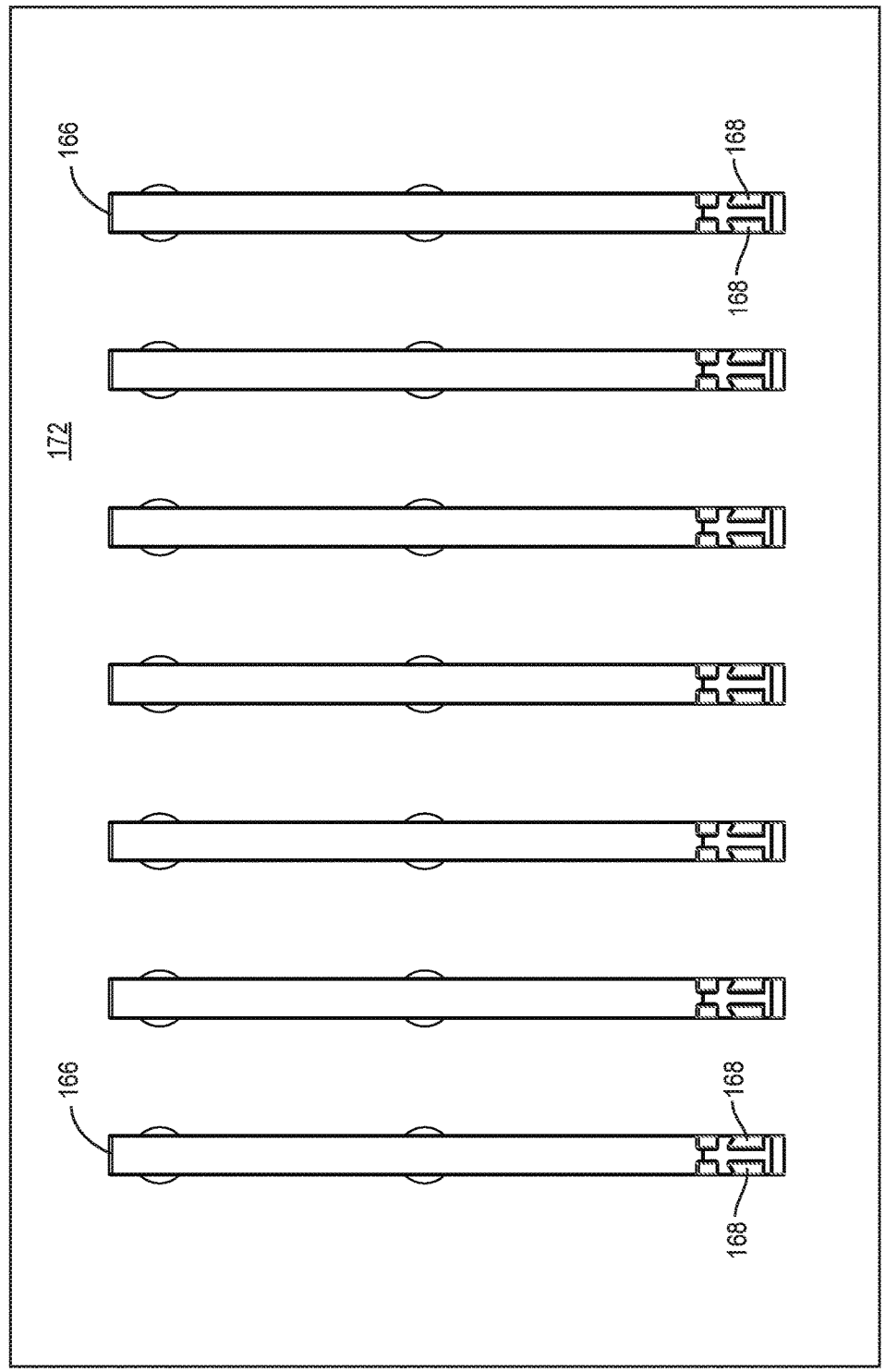
FIG. 4 depicts a plan-view of an optical distribution box with a plurality of mounting walls, according to an embodiment.
Figure 5:
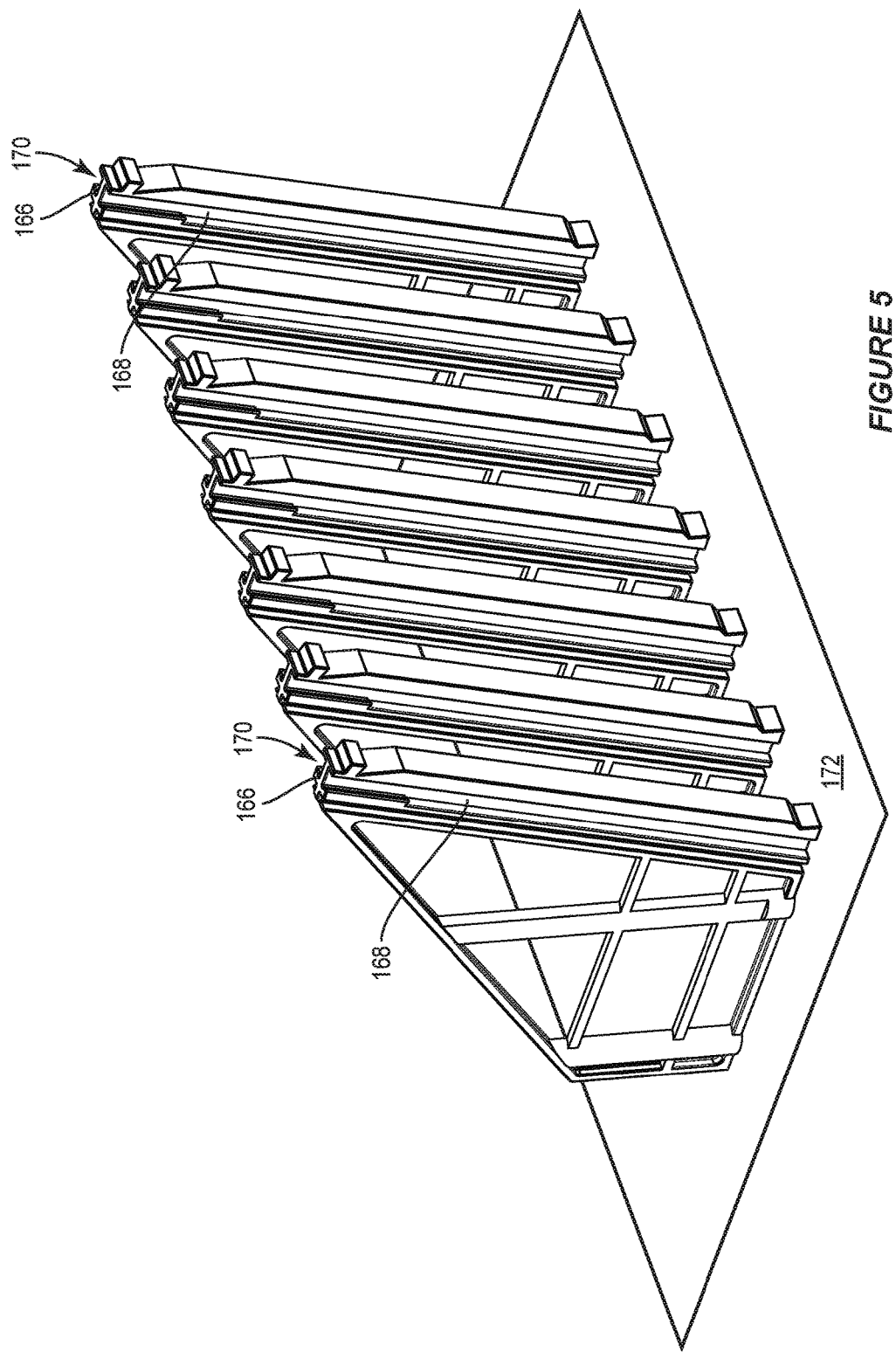
FIG. 5 depicts an isometric-view of an optical distribution box with a plurality of mounting walls, according to an embodiment.

Referring to FIGS. 4 and 5, mounting walls 166 that are provided within an optical distribution box are depicted. The mounting walls 166 are designed to slidably receive fiber optic modules, and in particular to slidably receive fiber optic modules that include rail features, such as the fiber optic modules described in the Solheid and Kramer patents. The mounting walls 166 are spaced apart from one another at regular intervals. Each mounting wall includes a pair of tracks 168 extending from a top side 170 of the mounting walls 166 to a floor of the optical distribution box 172. The tracks 168 formed in each mounting wall 166 face away from one another. Thus, for each spaced apart pair of mounting walls 166, there is a set of tracks 168 facing one another. The tracks 168 vertically extend from top to bottom at an oblique angle, relative to the floor 172 of the optical distribution box. According to an embodiment, the tracks 168 are disposed at an angle of between one hundred five and one hundred ten degrees relative to the floor 172 of the optical distribution box, and more particularly approximately one hundred seven degrees relative to the floor 172 of the optical distribution box.

Figure 6:
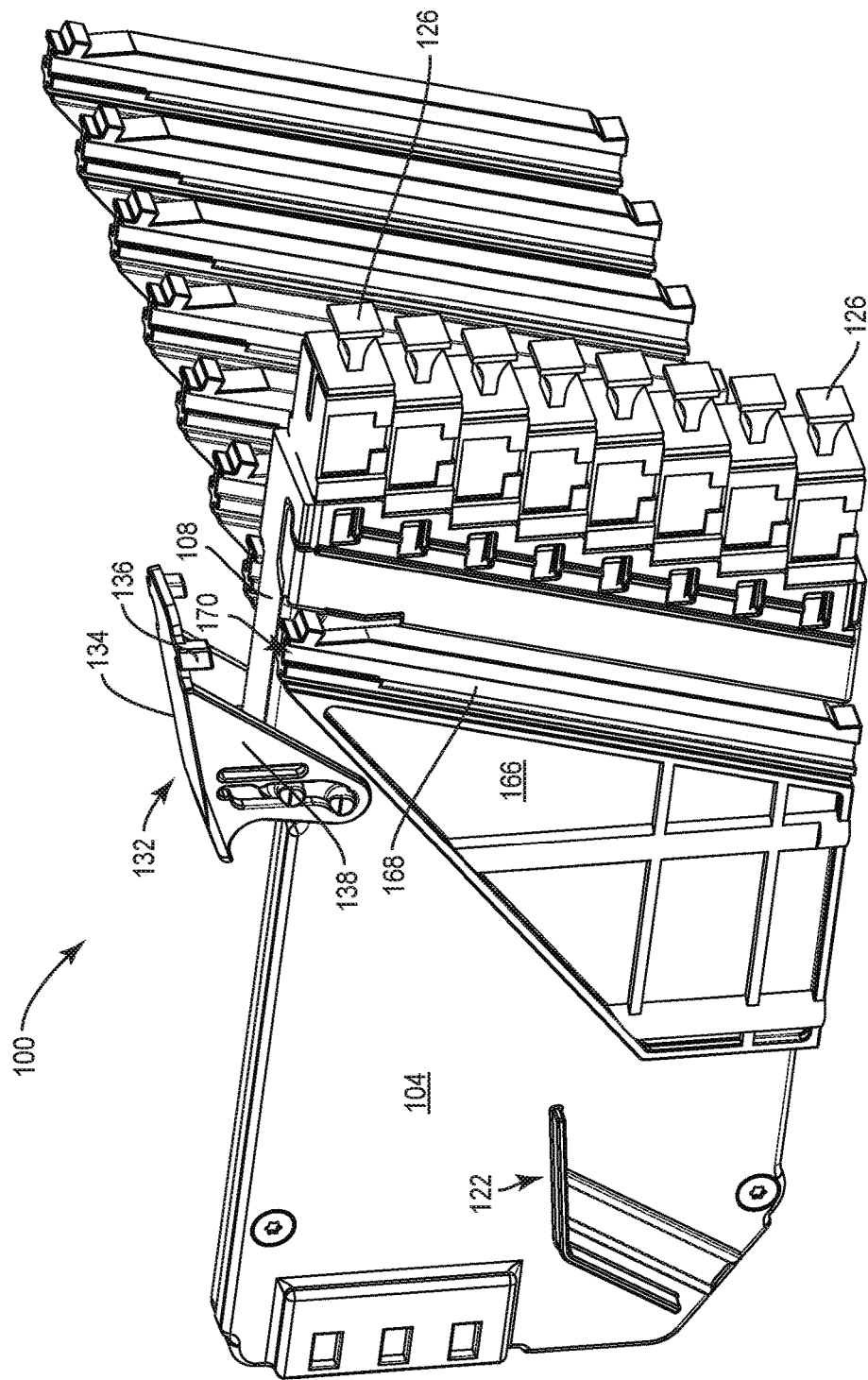
FIG. 6 depicts an isometric-view of the fiber optic cassette inserted between two of the mounting walls of the optical distribution box, according to an embodiment.

Referring to FIG. 6, one of the fiber optic cassettes 100 has been inserted between a pair of the mounting walls 166. This is done without slidably inserting any features of the cassette into the tracks 168 of the mounting walls 166. Instead, the planar surfaces of the first and second outer walls 104, 106 make gentle contact with the mounting walls 166 as the fiber optic cassette 100 gently slides between the mounting walls 166. The width of the fiber optic cassette 100, as determined by the spacing between the first and second outer walls 104, 106, is close to the distance between the pair of the mounting walls 166 so the fiber optic cassette 100 can loosely slide through the pair of the mounting walls 166. Thus, in the arrangement depicted in FIG. 3, the fiber optic cassette 100 is stabilized by the mounting walls 166, but is not secured in a fixed position. The angle of the front side 128 of the cassette, relative to the bottom wall 110, roughly approximates the angle of the tracks 168. Thus, the fiber optic connectors 126 are arranged in a staggered vertical array that roughly approximates the angle of incline of the tracks 168.

The moveable latch 132 of the fiber optic cassette 100 shown in FIG. 6 is arranged in the first titled position with the roof section 134 and the angled teeth 136 being vertically spaced apart from the top wall 108. When the moveable latch 132 is in the first position, the angled teeth 136 clear top side 170 of the mounting walls 166 where the sets of tracks 168 end thus allowing the moveable latch 132 to be positioned as depicted in FIG. 3 with the angled teeth 136 facing the top side 170 of the mounting walls 166.

Figure 7:
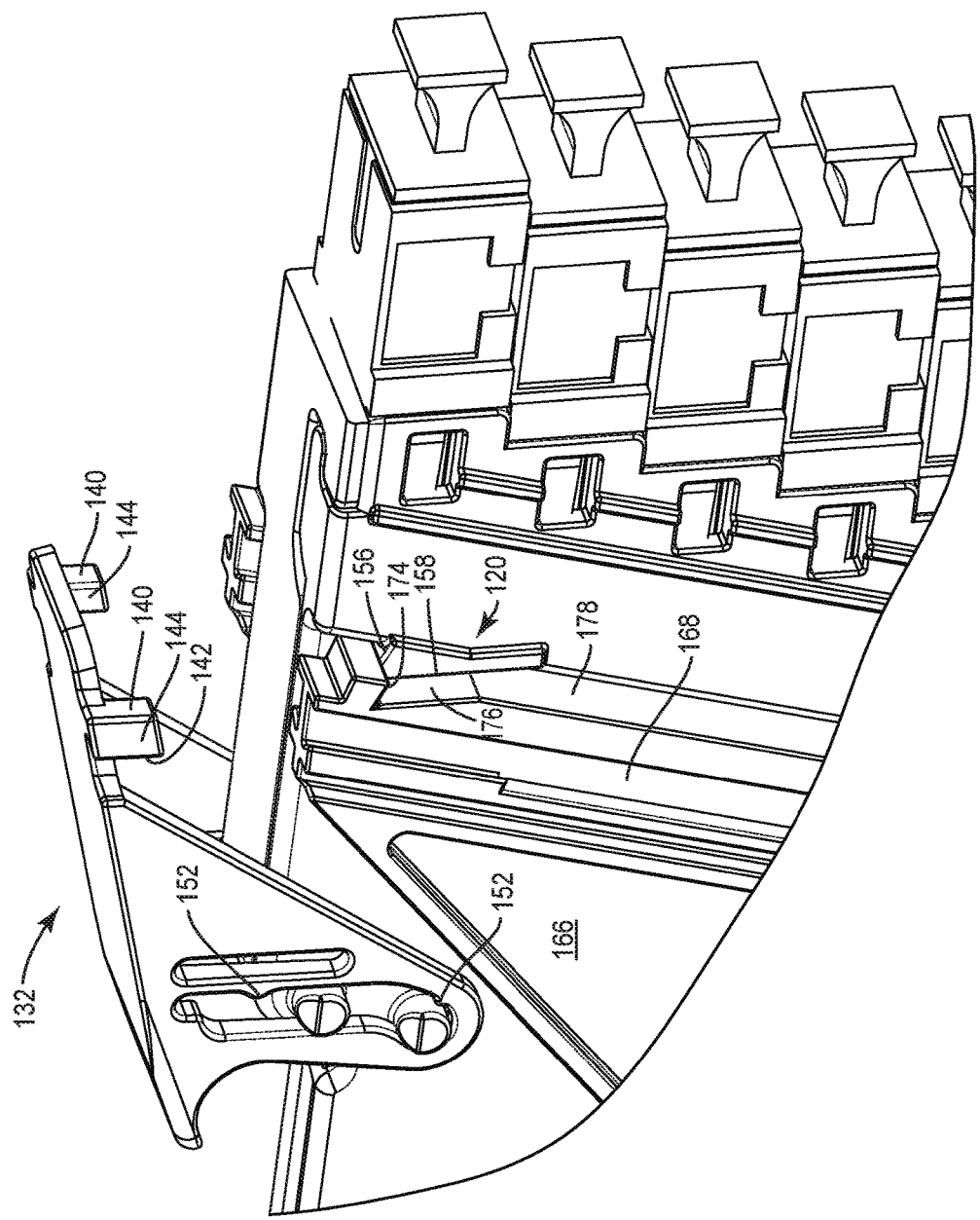
FIG. 7 depicts a close-up view of the movable latch of the fiber optic cassette being positioned over the mounting walls of the optical distribution box, according to an embodiment.

Referring to FIG. 7, a close up view of the moveable latch 132 and one of the mounting walls 166 is depicted. As can be seen, the first and second planar faces 156, 158 of the first angled shelf are engaged with corresponding first and second surfaces 174, 176 on the front side 178 of the mounting walls 166. The first and second planar faces 156, 158 have an inverse geometry as the corresponding first and second surfaces 174, 176 on the front side 178 of the mounting walls 166 so that the structures complement one another.

Figure 8:
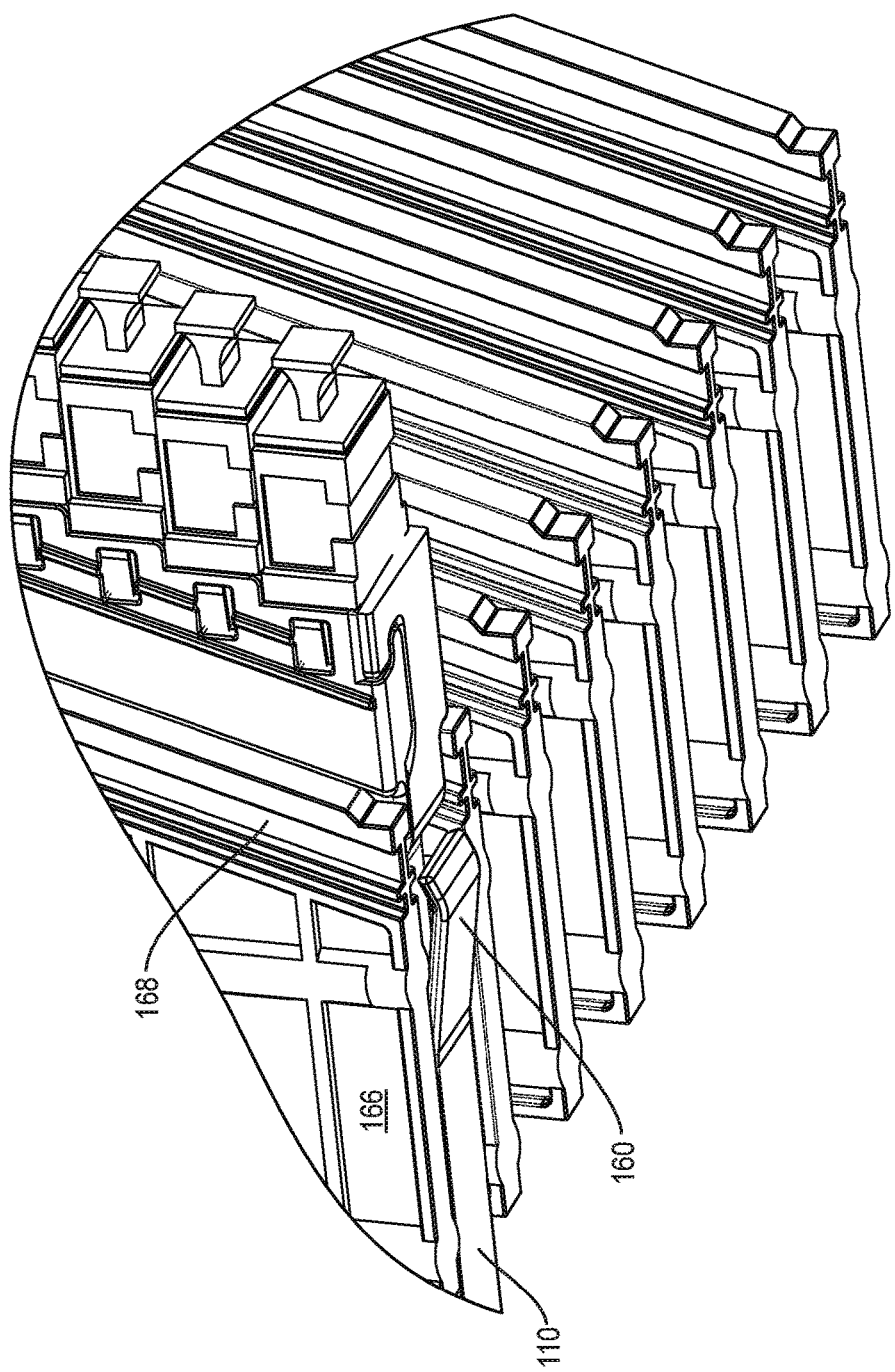
FIG. 8 depicts a close-up view of a spring loaded plank of the fiber optic cassette, according to an embodiment.

Referring to FIG. 8, an underside of the fiber optic cassette 100 is shown with the cassette being inserted between the pair of the mounting walls 166. In the figure, the spring loaded plank 160 is in the relaxed position. However, when there is floor 172 section flush against the bottom wall 110 and downward pressure is applied to the fiber optic cassette 100, the spring loaded plank 160 will retreat and respond by applying upward force on the fiber optic cassette 100. This upward force generates a pressing force between the first and second angled shelves 120 and the corresponding first and second surfaces on the front side 178 of the mounting walls 166. Thus, the first and second angled shelves 120 and the spring loaded plank 160 collectively provide a positioning feature 122 whereby the installer can lock the fiber optic cassette 100 into place by pressing down on the fiber optic cassette 100 and positioning the angled shelves 120 underneath the first and second surfaces on the front side 178 of the mounting walls 166.

Figure 9:
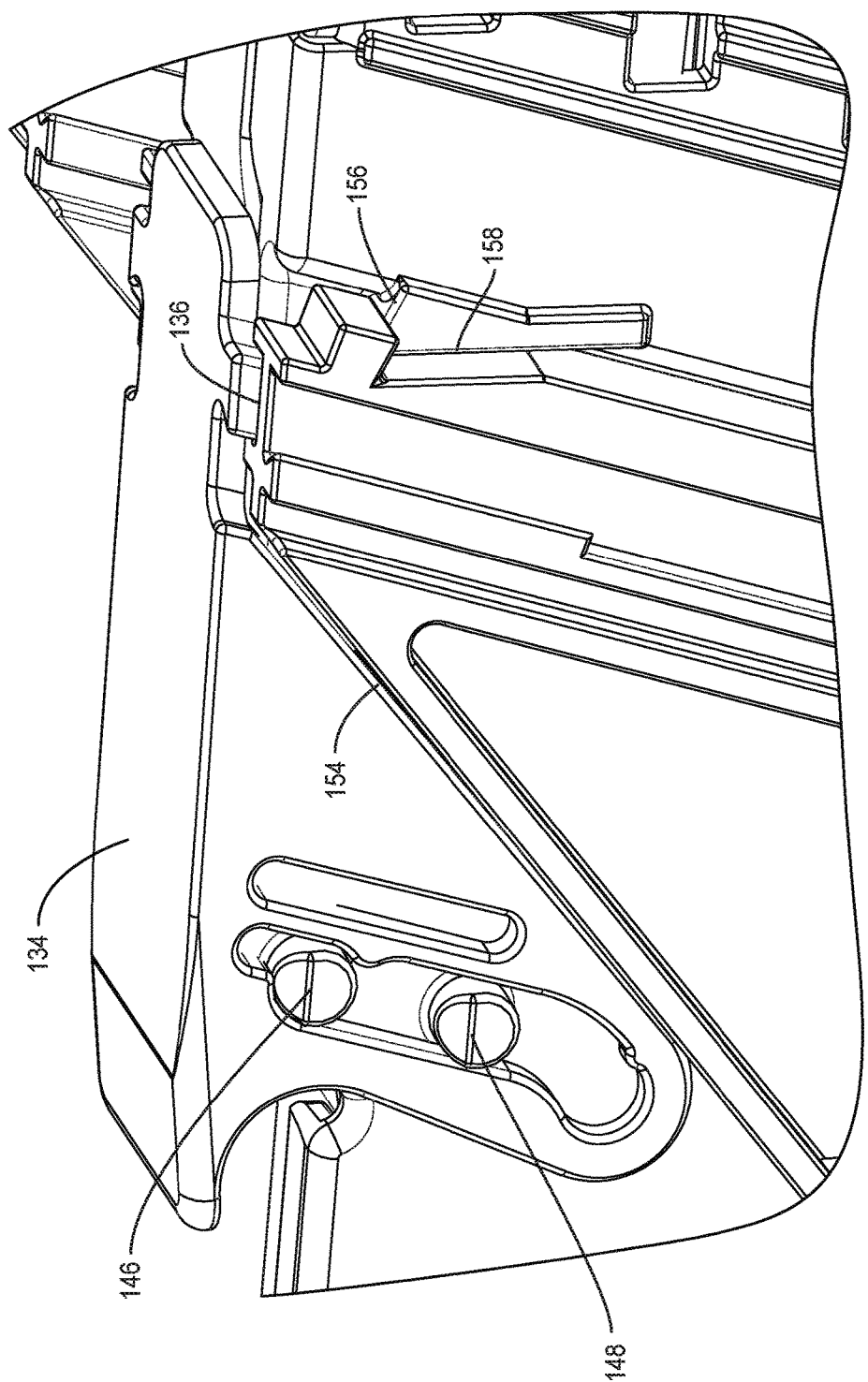
FIG. 9 depicts the fiber optic cassette with the movable latch being secured to the mounting walls from a side-view perspective, according to an embodiment.
Figure 10:
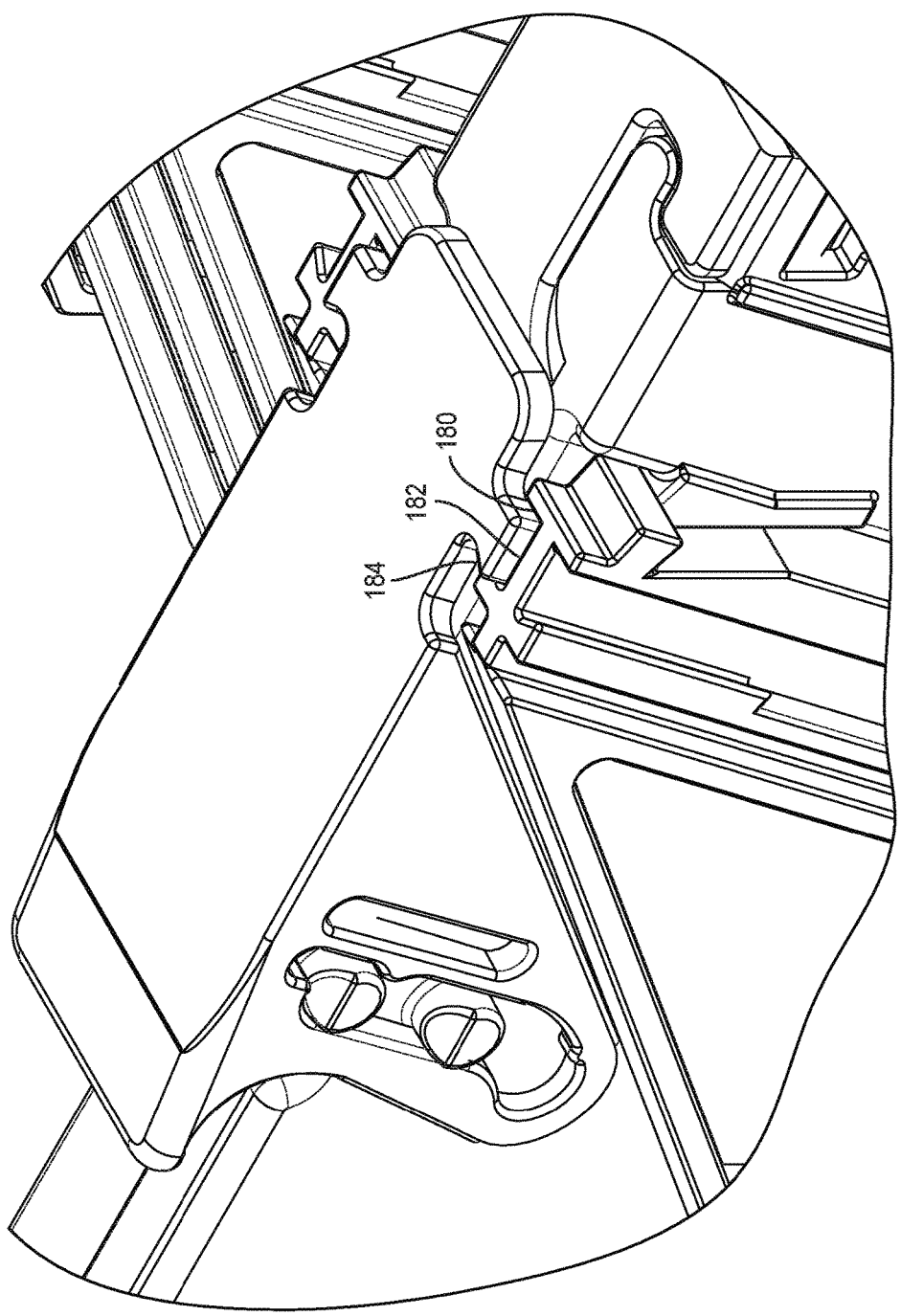
FIG. 10 depicts the fiber optic cassette with the movable latch being secured to the mounting walls from an isometric-view perspective, according to an embodiment.

Referring to FIGS. 9-11, close up views of the moveable latch 132 are depicted with the movable latch 132 being moved into the second position. The fiber optic cassette 100 is positioned between two of the mounting walls 166 and the first and second angled shelves 120 are engaged with the corresponding first and second surfaces on the front side 178 of the mounting walls 166.

As can be seen from the transparency view of the outer walls in FIG. 9, the angled teeth 136 are angled at a direction that is substantially identical to that of the tracks 168. This angle allows the angled teeth 136 to enter and align with a pair of the tracks 168.

As can be seen in 10 and 11, the tracks 168 of the mounting walls 166 have a complementary shape as the angled teeth 136. In particular, the tracks 168 include a first inner face 180 that is perpendicular to a second inner face 182, and a third inner face 184 that is disposed at an acute angle relative to the second inner face 182. Likewise, the angled teeth 136 have a front face 140 that is perpendicular to an outer face 144, and a rear face 142 that forms an acute angle with the outer face 144. This complementary dimensioning provides interlocking and retention in a direction that is perpendicular to the outer walls 104, 106 of the rear enclosure 102.

By moving the movable latch 132 into the second position, the fiber optic cassette 100 is securely fastened to both of the mounting walls 166. Moreover, this is achieved without slidably inserting rail shaped structurers along the length of the tracks 168. Instead, the movable latch 132 is positioned over the top 170 of the mounting walls 166 and the angled teeth 136 engage with only a small portion of the tracks 168 located at the top 170 of the mounting walls 166. The orientation of the vertical slots 150 causes the angled teeth 136 to slide from the first parallel position to the second position along a plane that aligns with the tracks 168.

The engagement between the angled shelf 120 and the front side 178 of the mounting walls 166 provides further stabilization that works in conjunction with the angled teeth 136 to securely retain the fiber optic cassette 100 in place. In addition to maintaining the fiber optic cassette 100 in a fixed position, moving the movable latch 132 into the second position has the additional benefit of maintaining appropriate spacing between the mounting walls 166. When one of the cassettes is inserted between two of the mounting walls 166 without any fastening to the mounting walls, e.g., in the manner depicted in FIG. 6, the mounting walls 166 may slightly pull apart from one another due to pressure being applied by the cassette. Snapping the movable latch 132 into place can have the effect of pulling the mounting walls 166 back together. As a result, the placement of the fiber optic cassette 100 between a pair of the mounting walls 166 does not encroach upon the spacing between adjacent pairs or mounting walls.

Figure 12:
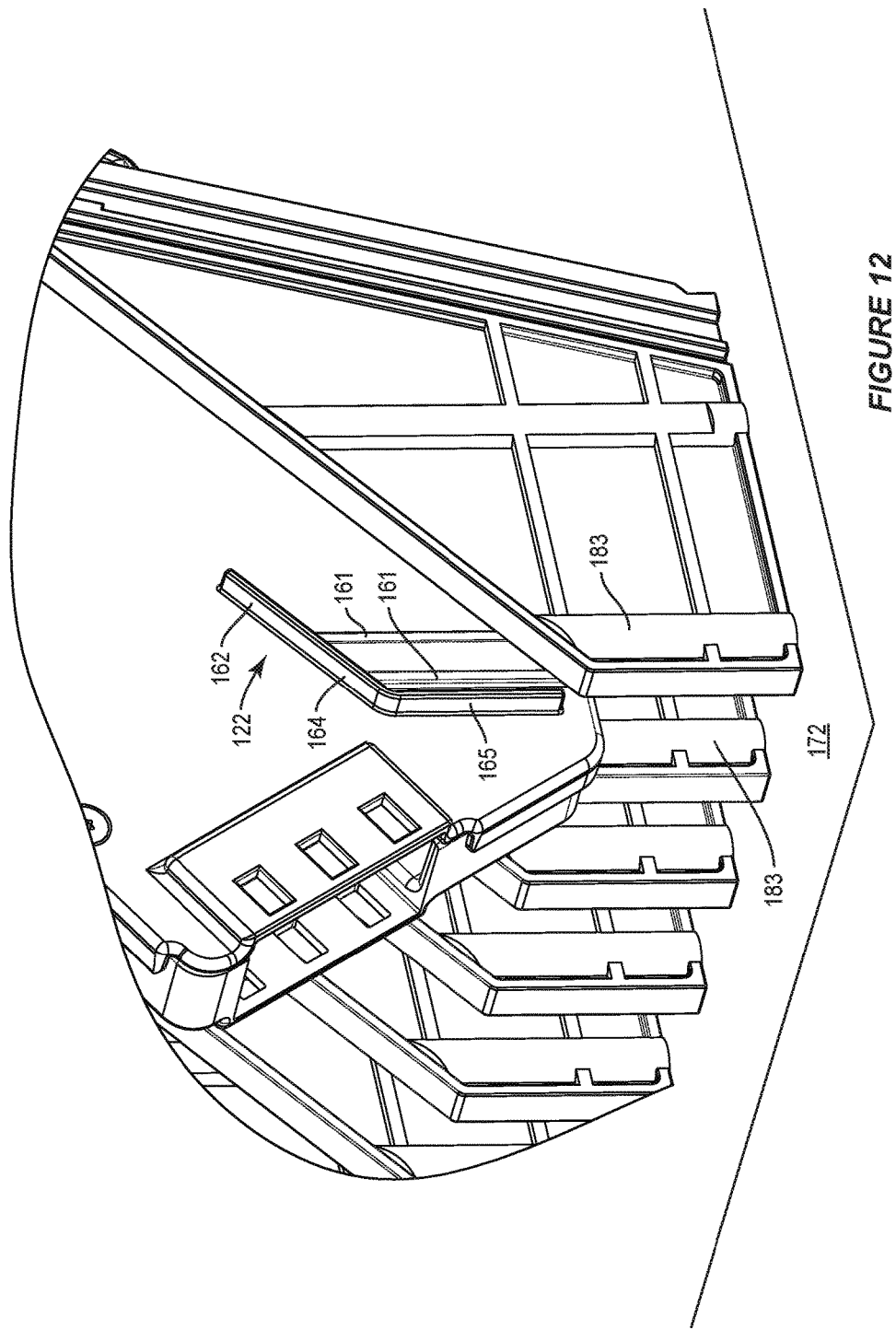
FIG. 12 depicts the fiber optic cassette being positioned for diagonal insertion at a rear end of the mounting walls, according to an embodiment.

Referring to FIG. 12, the fiber optic cassette 100 is diagonally positioned for insertion between two of the mounting walls 166 at a rear side of the mounting walls 166. In this arrangement, the movable latch 132 and the angled shelves 120 are disengaged from the mounting walls 166. The fiber optic cassette 100 is oriented so the pair of rails 161 of the positioning feature 122 align with cylindrically shaped posts 183 disposed at a rear side of the mounting walls 166.

Figure 13:
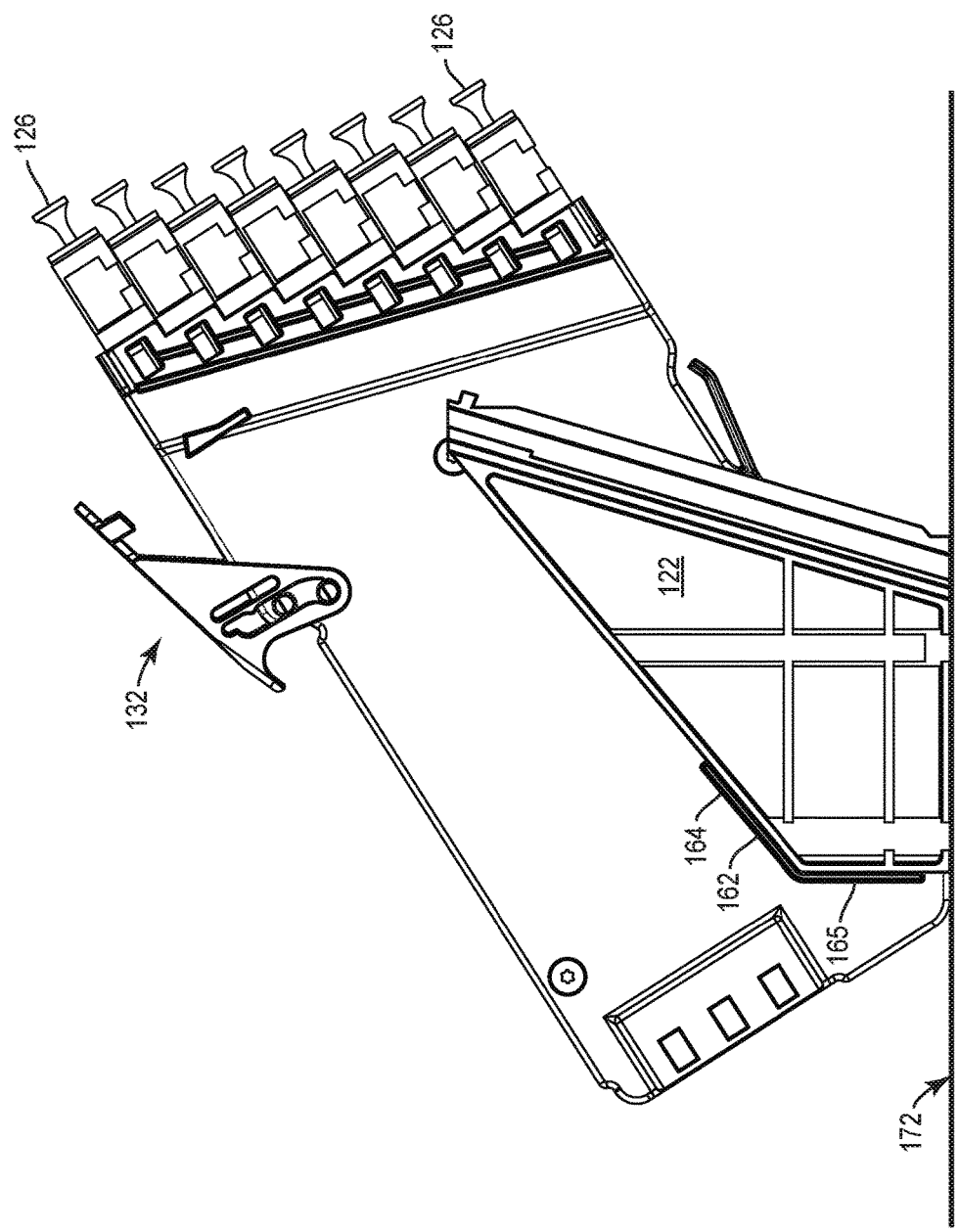
FIG. 13 depicts the fiber optic cassette being diagonally inserted at a rear end of the mounting walls, according to an embodiment.

Referring to FIG. 13, the fiber optic cassette 100 has been slid downward from the position of FIG. 12 so that the lower rear wall 118 is flush against the floor 172 of the optical distribution box. The angle of the lower real wall 118 allows the fiber optic cassette 100 to independently stand in this diagonal position. Moreover, the positioning feature 122 maintains the fiber optic cassette 100 in a relatively stable position when positioned in this manner. In particular, the pair of rails 161 align with and contact the cylindrically shaped posts 183 and thus prohibit lateral movement. Moreover, the angled planar surface aligns 122 with and contacts outer edge sides of the mounting walls 166 and thus prohibits rotational movement of the cassette.

The diagonal positioning of the cassette as shown in FIGS. 12 and 13 provides an installer with an additional positioning option that may be beneficial during fiber optic installations. In many cases, the optical distribution box is congested with a high number of cassettes and cables. If the cassette lies flat on the bottom wall 110, e.g., as depicted in FIG. 6, it may be difficult for the installer to access each of the standardized fiber optic connectors 126 at the front side 128 of the cassette. The positioning feature 122 and the diagonal lower real wall 118 therefore provide the installer with a quick and easy way to reposition the fiber optic cassette 100 so that the fiber optic connectors 126 are clear of any cabling congestion.

The embodiments described with reference to FIGS. 1-13 describe a fiber optic cassette 100 with features that are compatible with the mounting walls 166 provided in an NG3® Optical Distribution Frame, which is manufactured by CommScope®. In alternate embodiments, the fiber optic cassette 100 can be made to be compatible with different fiber optic organizational systems, and the features of the fiber optic cassette 100 can be adapted accordingly. For example, the shape or angle of the angled teeth 136 can be altered to conform to differently shaped or angled tracks. In the case of a system that does not included angled tracks 168, the angled teeth 136 can be discarded altogether, and alternative securing features can be used. More generally, the dimensions of the fiber optic cassette 100, and the relative position of the features of the fiber optic cassette 100 can be altered to conform to any system that includes spaced apart mounting walls 166.

The mechanisms of the fiber optic cassette 100 described herein can be substituted with alternate mechanisms that achieve similar functionality. For example, instead of the mechanism of the first and second posts 146, 148 and the vertical slots 150, the movable latch 132 can be reconfigured with any mechanism that is capable of moving the movable latch 132 between the first and second positions described herein. An example of such a mechanism is a hinge. As another example, instead of the spring loaded plank 160, the fiber optic cassette 100 can include differently structured springs that produce a spring force at the bottom of the cassette.

The term "substantially" as used herein encompasses absolute conformity with a requirement as well as minor deviation from absolute conformity with the requirement due to manufacturing process variations, assembly, and other factors that may cause a deviation from the ideal. Provided that the deviations are not significant enough to prevent the structure from being assembled in the manner described herein, or performing any of the required functions described herein, the term "substantially" encompasses any of these deviations.

Spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc., and are also not intended to be limiting. Like terms refer to like elements throughout the description.

As used herein, the terms "having," "containing," "including," "comprising," and the like are open-ended terms that indicate the presence of stated elements or features, but do not preclude additional elements or features. The articles "a," "an," and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A fiber optic cassette that is dimensioned to be inserted between two spaced apart walls of an optical distribution box, the fiber optic cassette comprising:
    an enclosure comprising first and second generally planar outer walls that are spaced apart from and parallel to one another, top and bottom walls that are spaced apart from and parallel to one another, and a rear wall;
    a plurality of standardized fiber optic connectors disposed along a front side of the enclosure, the front side being opposite the rear wall; and
    a movable latch that is anchored to the enclosure, the movable latch comprising a roof section and a pair of angled teeth, the roof section extending over the top wall of the enclosure, the angled teeth disposed at outer sides of the roof section and extending downwards from the roof section towards the bottom wall of the enclosure,
    wherein the movable latch is configured to move between a first position and a second position;
    wherein in the first position:
    the roof section and the angled teeth are vertically spaced apart from the top wall;
    wherein in the second position:
    the roof section is flush against the top wall;
    the first and second teeth overhang over the first and second outer walls; and
    the pair of angled teeth are disposed at an oblique angle relative to the bottom wall.

2. The fiber optic cassette of claim 1, wherein in the second position, the pair of angled teeth extend along a first retrograde plane, the first retrograde plane moving closer to a rear side of the enclosure with increasing distance from the top wall of the enclosure.

3. The fiber optic cassette of claim 2, wherein the first retrograde plane forms an angle of approximately one hundred seven degrees with the bottom wall.

4. The fiber optic cassette of claim 2, wherein each of the angled teeth comprise a generally planar front face, generally planar side faces, and a generally planar rear face, wherein the front face and the rear face extend along the first retrograde plane.

5. The fiber optic cassette of claim 4, wherein the side faces are parallel to one another and perpendicular to the front face, and wherein the rear face forms oblique angles with the side faces.

6. The fiber optic cassette of claim 2, wherein the front side of the cassette is inclined relative to the bottom wall such that the standardized fiber optic connectors are arranged in a staggered vertical array that is closer to the rear of the fiber optic cassette with increasing distance from the top wall.

7. The fiber optic cassette of claim 1, wherein the enclosure further comprises first and second vertically spaced apart posts disposed on each of the first and second outer walls, wherein the latch comprises a pair of sidewalls disposed at outer sides of the roof, the sidewalls overhanging over the first and second outer walls and each comprising a vertical slot, and wherein the first and second vertically spaced apart posts of each of the first and second outer walls are disposed in and engaged with the vertical slots of the sidewalls.

8. The fiber optic cassette of claim 7, wherein in the first position the first posts are each resting in lower detents in the vertical slots, and wherein in the second position the second posts are each resting in upper detents in the vertical slots.

9. The fiber optic cassette of claim 7, wherein the sidewalls of the moveable latch each comprise a front-facing edge side that extends from the roof section towards the bottom wall of the enclosure, and wherein in the second position, the front-facing edge side extends along a second retrograde plane, the second retrograde plane forming an angle of approximately one hundred thirty degrees with the bottom wall.

10. The fiber optic cassette of claim 1, wherein the enclosure further comprises first and second angled shelves extending away from the first and second outer walls, respectively, wherein each of the first and second angled shelves comprises first and second planar faces that are substantially perpendicular to the first and second outer walls, the first and second planar faces each extending along planes that are at an oblique angle relative to the top and bottom walls.

11. The fiber optic cassette of claim 1, wherein the enclosure further comprises a spring loaded plank extending away from the bottom wall, wherein the spring loaded plank is configured to retreat into a position that is generally parallel with the bottom wall and to apply upward vertical force to the cassette when in the retreated position.

12. The fiber optic cassette of claim 1, wherein the enclosure further comprises a lower rear wall extending from the bottom wall to the rear wall, the lower rear wall forming an obtuse angle with the bottom and rear walls.

13. The fiber optic cassette of claim 12, wherein cassette further includes a positioning feature disposed at a lower rear corner of the enclosure, the positioning feature comprising a pair of rails that intersect with and are perpendicular to the lower rear wall, and an angled planar surface comprising a first section that is parallel to the rails, and a second section that intersects with the rails.

14. A fiber optic cassette that is dimensioned to be inserted between two spaced apart walls of an optical distribution box, the fiber optic cassette comprising:
    an enclosure comprising first and second generally planar outer walls that are spaced apart from and parallel to one another, top and bottom walls that are spaced apart from and parallel to one another, and a rear wall;
    a plurality of standardized fiber optic connectors disposed along a front side of the enclosure, the front side being opposite the rear wall; and
    a movable latch that is anchored to enclosure, the movable latch comprising a roof section and a pair of angled teeth;
    first and second angled shelves extending away from the first and second outer walls; and
    a spring loaded plank having one end extending away from the bottom wall,
    wherein the spring loaded plank is configured to retreat into a retreated position that is generally parallel with the bottom wall and to apply upward vertical force to the cassette when in the retreated position.

15. The fiber optic cassette of claim 14, wherein the movable latch is configured to move between a first position in which the roof section and the angled teeth are vertically spaced apart from the top wall and a second position in which the roof section is flush against the top wall and the first and second teeth overhang over the first and second outer walls, wherein in the second position, the first and second teeth extend along a first retrograde plane, the first retrograde plane moving closer to a rear side of the enclosure with increasing distance from the top wall of the enclosure.

16. The fiber optic cassette of claim 14, wherein each of the first and second angled shelves comprise first and second planar faces that are substantially perpendicular to the first and second outer walls, the first and second angled shelves comprise first and second planar faces that are substantially perpendicular to the first and second outer walls, the first and second planar faces each extending along planes that are at an oblique angle relative to the top and bottom walls.

17. A system for organizing a plurality of fiber optic connections, the system comprising:
    an optical distribution box comprising a plurality of mounting walls, each of the mounting walls being spaced apart from one another at regular intervals, wherein each of the walls comprises a pair of tracks extending from a top side of the mounting walls to a floor of the optical distribution box, wherein the tracks are arranged at an oblique angle relative to the floor;
    a fiber optic cassette, comprising:
    an enclosure comprising first and second generally planar outer walls that are spaced apart from and parallel to one another, top and bottom walls that are spaced apart from and parallel to one another, and a rear wall;
    a plurality of standardized fiber optic connectors disposed along a front side of the enclosure, the front side being opposite the rear wall; and
    a movable latch that is anchored to enclosure, the movable latch comprising a roof section and a pair of angled teeth;
    first and second angled shelves extending away from the first and second outer walls,
    wherein the first and second generally planar outer walls are spaced apart from one another by a distance that is at least substantially close to a distance between a pair of the mounting walls, and
    wherein the movable latch and the first and second angled shelves are configured to secure the fiber optic cassette to a first pair of the tracks with the first and second angled teeth being engaged with top sections of the first pair of tracks and the first and second angled shelves being flush against corresponding first and second surfaces disposed on a front side of the mounting walls.

18. The system of claim 17, wherein the movable latch is configured to move between a first position in which the roof section and the angled teeth are vertically spaced apart from the top wall and a second position in which the roof section is flush against the top wall and the first and second teeth overhang over the first and second outer walls, and wherein the fiber optic cassette is secured to the first pair of the tracks by moving the movable latch into the second position with the angled teeth being aligned with the first pair of the tracks.

19. The system of claim 18, further comprising a spring loaded plank having one end extending away from the bottom wall, wherein the first and second angled shelves and the spring loaded plank are collectively arranged to secure the fiber optic cassette into a fastening position with the first and second angled shelves being pressed against the corresponding first and second surfaces on the front side of the mounting walls, the pressing force being applied by the spring loaded plank, and wherein in the fastening position the movable latch aligns with the with the first pair of the tracks.

* * * * *